Nov. 21, 1944.   R. A. FONTAINE   2,363,170
TRAILER BODY AND FLOOR CONSTRUCTION
Filed Feb. 3, 1941   3 Sheets-Sheet 1
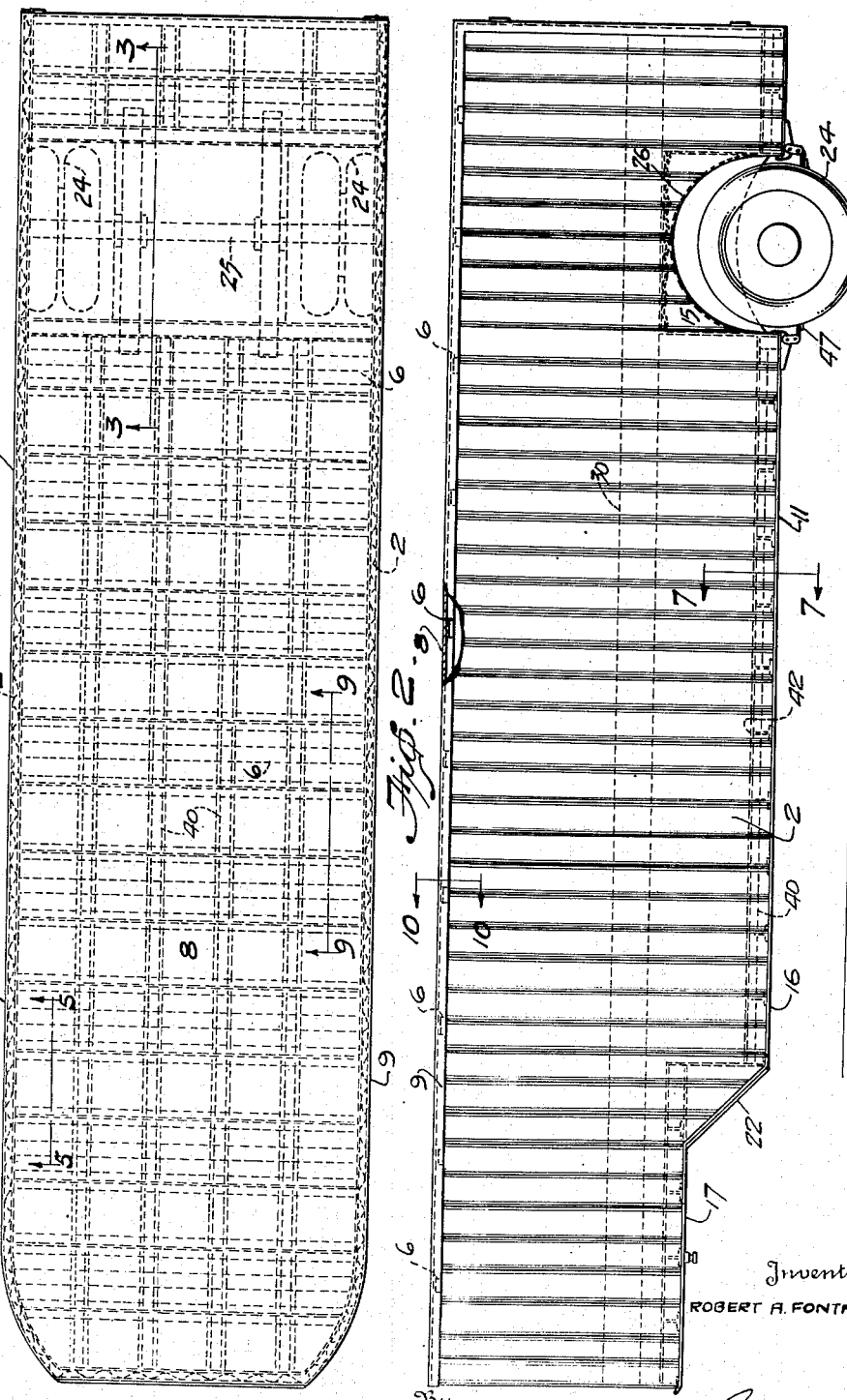
Inventor
ROBERT A. FONTAINE

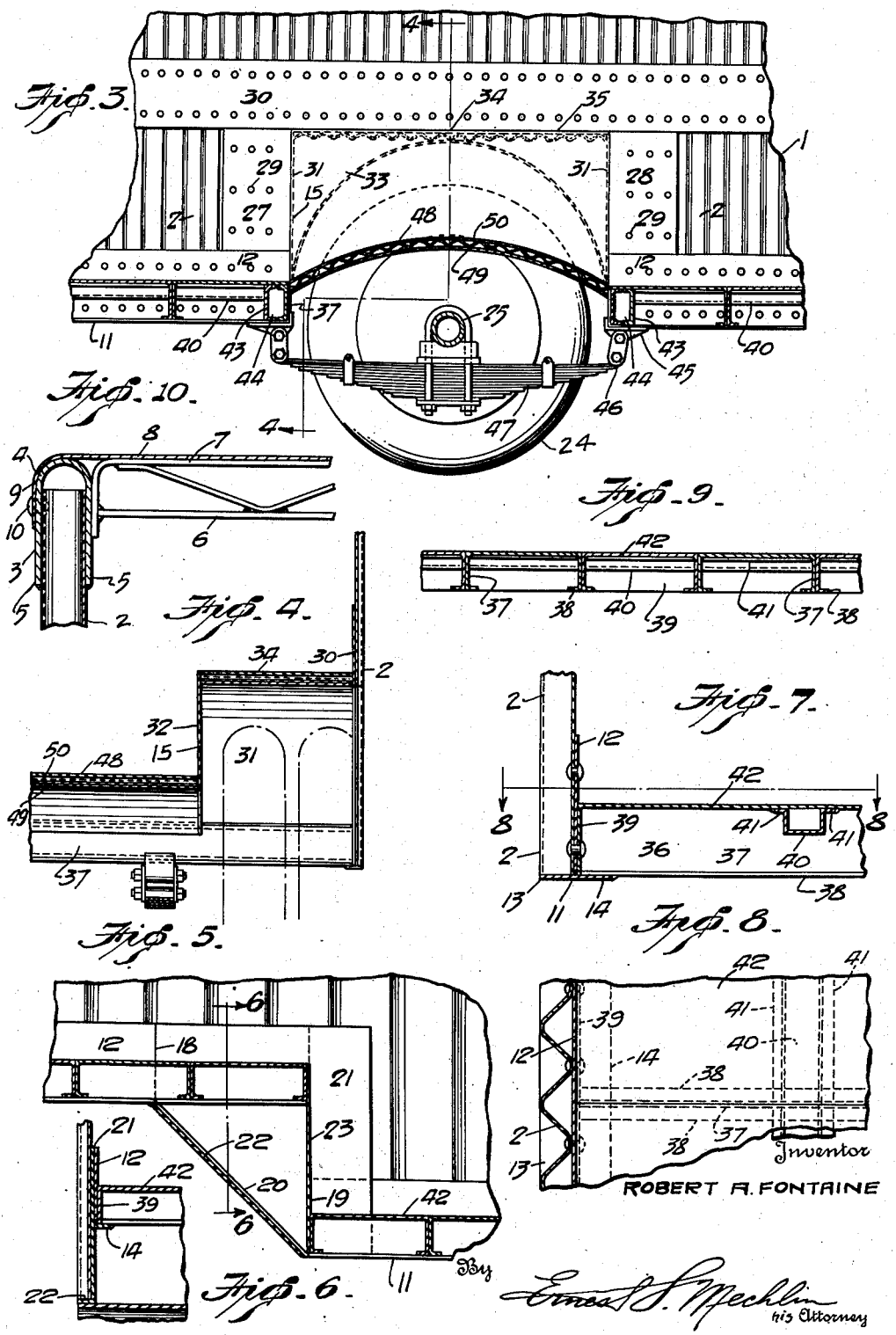

Nov. 21, 1944.     R. A. FONTAINE     2,363,170
TRAILER BODY AND FLOOR CONSTRUCTION
Filed Feb. 3, 1941     3 Sheets-Sheet 3
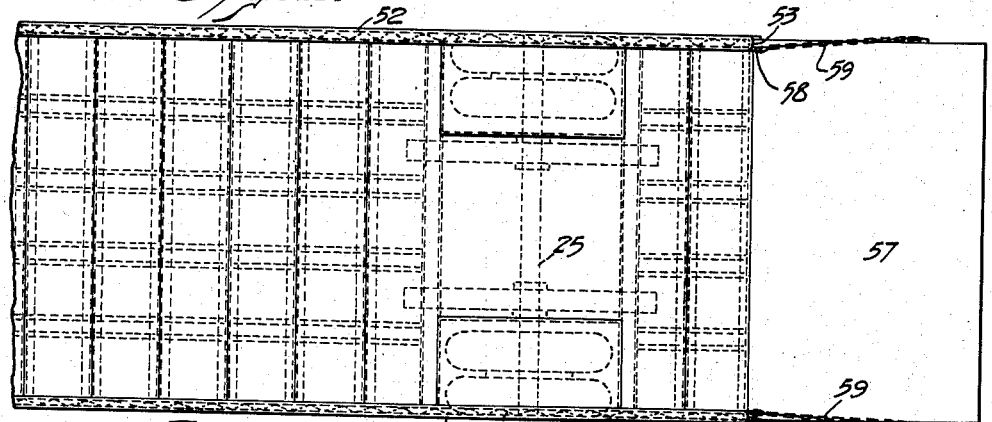
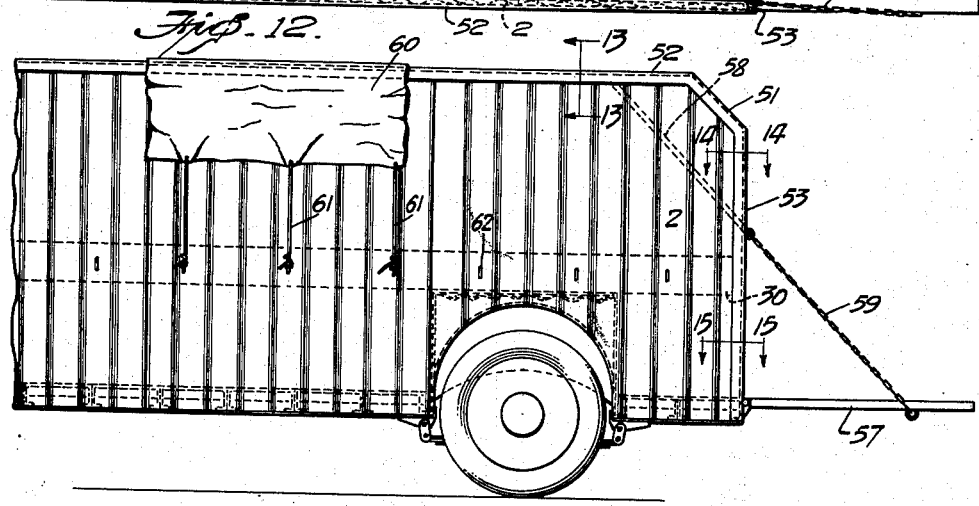
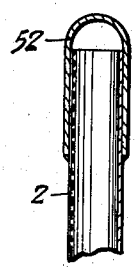
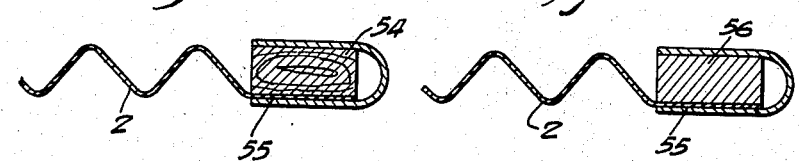
Inventor
ROBERT A. FONTAINE Patented Nov. 21, 1944

2,363,170

UNITED STATES PATENT OFFICE 2,363,170

TRAILER BODY AND FLOOR CONSTRUCTION

Robert A. Fontaine, Roanoke, Va.

Application February 3, 1941, Serial No. 377,229

2 Claims. (Cl. 296—28)

The invention relates to trailers for motor vehicles and more particularly to trailer body and floor construction.

The principal object of the invention, generally stated, is to provide a trailer body, either of the closed or open type, of great strength and lightness.

Another object of the invention is to provide a trailer having a floor construction and side walls extending upwardly therefrom, said side walls being of corrugated metal and being preferably continuous from end to end of the vehicle body.

Still another object of the invention is to provide a strengthening member in connection with the upper marginal edge of the corrugated metal side walls, said member being adapted to embrace said marginal edge and provide its upper edge with a smooth contoured surface adapted to receive either a roof sheet of a closed vehicle or a canvas cover of an open body.

Still another object of the invention is to provide means for strengthening the connection between the portion of the floor adapted to overlie the motor truck and the adjacent portions of the floor which is preferably carried at a lower elevation.

Still another object of the invention is to provide means for housing the rear axle and wheel assembly and to so construct the body adjacent thereto as to provide adequate strength with minimum weight.

Still another object of the invention is to provide a novel floor beam construction, each beam being of inverted U-form, the upper surfaces of the beams being adapted to lie in the same plane and form the floor construction, the flanges of the beams being adapted to contact to provide means for permanently and rigidly uniting each beam to the two adjacent beams.

Still another object of the invention is to provide, in connection with floor beams of the type described, reinforcing members extending transversely of the beam, said transverse members being positioned in alinement and forming, when the floor is assembled, longitudinally extending girders for strengthening the floor construction.

Other objects of the invention will appear from a more detailed description of the same when taken in connection with the accompanying drawings in which:

Figure 1 is a top plan view of a closed trailer body embodying my invention.

Figure 2 is a side elevation of the trailer body illustrated in Figure 1.

Figure 3 is a cross section taken on the line 3—3 of Figure 1, the section being viewed as indicated by arrows at the ends of the section line.

Figure 4 is a cross section taken on line 4—4 of Figure 3, the direction of view being indicated by the arrows adjacent the ends of said section line.

Figure 5 is a vertical section taken on line 5—5 of Figure 1, the direction of view being indicated by the arrows adjacent the ends of said section line.

Figure 6 is a fragmentary transverse section taken on line 6—6 of Figure 5, the direction of view being indicated by the arrows at the ends of said section line.

Figure 7 is a partial vertical section taken on line 7—7 of Figure 2, the direction of view being indicated by the arrows adjacent the ends of said section line.

Figure 8 is a view partially in plan and partially in section, the section being taken on the line 8—8 of Figure 7 and the direction of view being indicated by the arrows adjacent the ends of said section line.

Figure 9 is a vertical sectional view taken on line 9—9 of Figure 1, the direction of view being indicated by the arrows adjacent the ends of said section line.

Figure 10 is a partial vertical section on the line 10—10 of Figure 2, the direction of view being indicated by the arrows adjacent the ends of said section line.

Figure 11 is a view similar to Figure 1, illustrating however a plan view of an open trailer body and showing the tail gate in horizontal position.

Figure 12 is a side elevational view of the construction shown in Figure 11, said view also illustrating a fragmentary portion of a cover which may be applied to close the open top of said trailer.

Figures 13, 14 and 15 are, respectively cross sectional views taken on corresponding lines of Figure 12, in each case the direction of view being indicated by the arrows adjacent the ends of said section line.

Throughout the specification and drawings like parts are designated by like reference characters.

In the drawings the numeral 1 is used to designate the closed body as a whole. The said body preferably comprises a wall or siding member 2 which may be and preferably is continuous, that is the siding member 2 may extend from the rear end of the truck forwardly around the forward end and then rearwardly to the opposite rear end of the truck as a continuous sheet, or several sheets having their adjoining ends connected together may be used for this purpose. The upper edge of the siding 2 terminates in a single plane and there is provided a rigidifying member 3 co-terminous with the siding and preferably formed as an inverted rolled U having a curved closure member 4 connecting the side walls 5, the side walls being adapted to lie on opposite sides of the corrugated siding, the marginal edge of which terminates at the spring line of the curved portion 4, and the side walls 5 being adapted to be welded to the adjacent portions of the corrugations wherever they contact the same. In the closed body I connect the members 3 by carlines 6, the upper face 7 of each carline lying in a plane tangent to the curved face 4 and I then connect to the carline a roof member 8, the end portions 9 of which extend respectively over the curved portions 4 and downwardly on the outer leg 5 of each of the member to which it may be secured by rivets 10.

It will be observed from the foregoing description that in the closed body the roof sheet 8 extends over the members 3 and is curved to correspond thereto so as to form a smooth marginal edge and that with the roof sheet engaging the outer face of the members and the carlines engaging the inner face of the members 3 a tremendously strong but light construction is achieved which prevents the weaving and distortion of the side wall or siding of the vehicle.

At the lower marginal edge of the siding I provide an inverted T-member 11 best illustrated in Figure 7, the vertical 12 of the T extending upwardly along the inner face of the siding and the flange 13 extending outwardly and forming a base or seat against which the lower marginal edge of the siding 2 is adapted to rest, the width of the said flange 13 being preferably of the width or depth of the corrugations in the said siding. The said T member 11 is also provided with an inwardly directed flange 14, the purpose and object of which will hereinafter be described.

The flanges of the T member are preferably continuous and extend from the forward edge of the axle housing 15 to the forward edge of the oppositely disposed axle housing on the opposite side of the body. Since the lower marginal edge of the trailer body is disposed in two planes it is obvious that at the point of connection between the lower plane 16 and the upper plane 17 the web of the T member 11 must be cut so as to permit the flanges 13 and 14 to be directed at an angle to the spaced planes 16 and 17. This construction is best illustrated in Figure 5, the web 12 of the T member being eliminated from the point 18 of the upper plane to the point 19 of the lower plane, the flanges 13 and 14 being bent upwardly as indicated at 20.

From the point or vertical plane 18 and extending rearwardly to a plane behind the point or plane 19 I provide a plate member 21, the upper edge of which is preferably positioned in the plane of the upper edge of the web 12, a portion of the lower edge of the plate 21 being preferably positioned in the plane of the upper face of the flanges of the said T-beam 11. The connecting lower edge of the plate 21 is crimped so as to overlie and contact the inner flange 14 of the T member 11 so that there is provided a triangular gusset plate connecting the upper and lower portions of the floor construction at each side of the vehicle body.

In order to close the outer face of this opening formed by the flanges of the T member and by portions of the plate 21 I preferably employ a flat plate 22 which extends from side to side of the vehicle underlying the flanges 13 and 14 and preferably welded to the same, and to close the opening between the plane of the upper floor member and the plane of the lower floor member I provide a vertical plate 23 which also extends from inside to inside of the vehicle and is preferably welded to the adjacent floor beams on its opposite faces. It will be understood that at the point or plane 18 the plate 21 is butt welded to the web 12 of the T and at the point or plane where the plate 21 overlies the web 12 of the T member spot welds may be used to rigidly unite the plates 21 with the adjacent portion of the web of the T member.

In order to maintain the floor level of the body as near the ground as possible I provide adjacent the outer end of the body a pair of axle housings 15, each of which is adapted to house the dual wheels 24 mounted on the opposite ends of the axle 25. Since it is essential in the operation of a truck to make wheel changes from time to time it is desirable that the housings 15 be so constructed as to permit the ready removal and insertion of the wheels 24. This is accomplished by terminating the siding adjacent the upper periphery of the said wheels in the curved line 26, the marginal edge of the curved line being spaced above the periphery of the adjacent wheel a sufficient distance to permit the removal or insertion of the wheel without interference.

It will be obvious that between the forward and rear edges of each axle housing the T-beam 11 must be eliminated and in order to compensate for this loss of the T-beam I provide the following construction. Extending upwardly from the marginal edge of the web 12 of the T-beam 11 I provide plates 27 and 28 and since the construction of each side of the vehicle is identical the description of one side will suffice for both. The plates 27 are butt welded to the respective portions of the web 12 and are preferably riveted to the siding 2, as clearly illustrated in Figure 3, the rivets 29 being counter-sunk at the inner wall so as to lie flush with the surfaces of the plates 27 and 28. These plates extend upwardly and are butt welded to the adjacent portion of a metallic belt rail 30, the latter being continuous and co-terminous with the siding. Connected to the adjacent inner edges of the plates 27 and 28 are flat transversely extending plate members 31 which form the lateral faces of the well for each pair of wheels 24. The inner ends of the plates 31 are connected by a longitudinally extending plate 32 in order to entirely enclose the inner face of each wheel housing or well. On the outer face of each housing the siding 2 extends downwardly so as to have the lower marginal edge thereof coincide with the curved edge of a plate 33. The top wall of the housing is formed by a plate 34, said plate extending outwardly from the plate 32 and bridging the space between the plates 31 and being welded to the same and to the plates 32 and to the lower marginal edge of the belt rail 30. If desired, a corrugated reinforcing plate 35 may be positioned so as to underlie the plate 34, said corrugated portion being adapted to entirely cover the exposed surface of the plate 34 and being preferably connected to the adjacent siding 2 and the plates 31 and 32.

It will be understood from the foregoing description and from an inspection of Figures 2 and 3 of the drawings that rearwardly of each axle housing the T-beams are continued to the respective end walls of the vehicle.

Referring now to the floor construction I provide a series of inverted U-shaped beams 36, each of which is adapted to extend transversely of the vehicle body. It will be understood, of course, that the marginal ends of these beams are adapted to conform to the shape of the adjacent portions of the T-beam 12 and each of the beams 35 is of sufficient length to bridge the entire space transversely of the vehicle between the web 12 of the oppositely disposed portions of the T-beam 11. Each of the floor beams 36 is provided with marginal flanges 37 having inturned flanged portions 38 thereon and at the ends of each beam there are provided down-turned flanges 39 adapted to abut the web 12 of the beam 11. The flanges 38 of each beam are adapted to overlie and contact the adjacent flange 14 of the beam 11 and are preferably welded to the same. The marginal flanges 37 are, with the exception of the end beams, adapted to engage and abut the marginal flanges of the two adjacent beams, as is clearly indicated in Figure 9, and these abutting flanges are adapted to be spot welded together so as to form in fact a unit construction, the unit being made up of a plurality of inverted U or box beams, the marginal edges of which, together with the inturned flange 38, form a plurality of transverse stiffening beams adapted to rigidify the entire body construction. Each of the box beams is preferably provided with a reinforcing beam 40, each of the beams 40 being of U-shape and having flanged marginal edges 41. I preferably provide four of these beams 40 for each floor beam 36 and they are preferably spaced substantially equal distance apart. Each of the beams 40 extends from the marginal flange 37 on one side of the beam to the opposite marginal flange 37 and each of the beams 40 is preferably welded to the bottom plate of the beam 36 as well as to the flanges 37, as clearly indicated in Figure 7. The beams 40 are so positioned in respect of each of the beams 36 that when the beams 36 are in assembled position each of the beams 40 is in fact a continuation of the similarly positioned beam in each of the floor beams 36 so that, as clearly indicated in Figures 1 and 11, the beams 40 form in effect longitudinal girders which further stiffen the floor construction and serve to rigidify the entire body construction.

In each of the floor beams 36, which lie on opposite sides of the axle housing 15, I insert adjacent the marginal flange 37 a channel beam 43, the said channel beams 43 and the marginal flange 37 of the adjacent beam forming a box beam construction and in these two floor beams I preferably terminate the reinforcing beams 40 at the web of the said channel beam 43. In this manner I form on opposite sides of the axle housing box beams 44 to which are connected, by welding or other suitable means, the brackets 45 to which the shackles 46 of the springs 47 are attached. The box beams extend for the full width of the vehicle and between the plates 32 of the axle housings I provide a curved floor member 48 which preferably comprises a pair of plate members 49 between which is received a corrugated sheet portion 50, the plates 49 and the corrugated sheet metal 50 being secured together and extending from the forward beam 44 to the rear beam 44 to form a floor or passageway between each of the axle housings.

Referring now to Figures 11 to 15, inclusive, in which I have illustrated an open topped trailer body, it will be observed that the floor and siding construction and the upper reinforcing member are identical with that previously described, the carlines 6 and the roofing member 8, of course, being omitted. The member 33 is provided with a down-turned portion 51 serving to connect the horizontal portion 52 to the vertical end portion 53. In order to interlock the vertical marginal edge of the siding 2 between the belt rail 30 and the inclined portion 51 of the member 3, I provide a wood block or beam 54, said block filling the opening between the arms 5 and the member 3 and interlocking the straight portion 55 of the siding 2 in position. In order to strengthen this same connection from the belt rail downwardly I provide a metal beam 56 which also fills the space and interlocks the portion 55 of the siding in assembled portion.

The open body is preferably provided with the usual tail gate 57 which may be supported from the members 3 by rods 58 and chains 59 so as to increase the loading area of said body. If desired, there may be employed with the open body a canvas or tarpaulin cover 60, the marginal edges of which are adapted to be secured by ropes 61 to hooks 62 extending outwardly from the siding and preferably passing through the siding and connected to the belt rail 30.

Having thus described my invention, what I claim is:

1. A trailer body for motor vehicles comprising a pair of vertically spaced structural members, said members being substantially identical in plan, one of said members being adapted to serve as a marginal floor beam said last named member being of inverted T-shape in cross section, a plurality of metal floor members extending transversely of said body and overlappingly associated with and secured to adjacent web and flange portions of said floor beam, each of said floor members having downwardly extending side flanges, means for connecting certain of said side flanges of said floor members, a wheel housing interrupting said floor members and intersecting said floor beam on opposite sides of said body, and means for rigidly connecting said floor members and the interrupted portions of said floor beam adjacent each of said intersections, said last means including a belt rail bridging the said wheel housing and gusset plates positioned on opposite sides of said housing and connected to said rail.

2. A trailer body for motor vehicles comprising a vertically corrugated continuous siding extending from the rear of said body on one side to the opposite rear end, a belt rail conforming to said siding and co-terminous therewith, means for rigidly connecting said belt rail and siding, an inverted T beam having one flange thereof underlying said siding, said T member being substantially co-terminous with said siding, the opposite flange of said T member underlying and serving as a support for adjacent ends of transversely extending inverted U-shaped metallic floor members, said T beam having corresponding portions on opposite sides of the said body cut away to provide for a wheel housing, and means for rigidly connecting the adjacent ends of the said T beam on opposite sides of said cut away portions, said means including a plurality of plate members each of which is secured to said belt rail, to the web of the adjacent portion of said T-beam and to the ends of the adjacent metallic floor members.

ROBERT A. FONTAINE.